(12) United States Patent
Chen et al.

(10) Patent No.: US 7,035,866 B1
(45) Date of Patent: Apr. 25, 2006

(54) SYSTEM AND METHOD PROVIDING DIFFGRAM FORMAT

(75) Inventors: Chia-Hsun Chen, Redmond, WA (US); Luca Bolognese, Kirkland, WA (US); Vincenzo Lombardi, Bellevue, WA (US); Omri Gazitt, Redmond, WA (US); Michael J. Pizzo, Bellevue, WA (US); Jason Zhengnan Zhu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 09/973,242

(22) Filed: Oct. 9, 2001

(51) Int. Cl.
*G06F 17/18* (2006.01)

(52) U.S. Cl. ...................................... 707/102; 715/513
(58) Field of Classification Search ................ 715/513, 715/500.1, 521, 523; 707/5, 201, 203, 7, 707/8, 102
See application file for complete search history.

(56) References Cited

U.S. PATENT DOCUMENTS

| | | | |
|---|---|---|---|
| 6,260,042 B1 | 7/2001 | Curbera et al. | 707/101 |
| 6,502,112 B1* | 12/2002 | Baisley | 715/513 |
| 6,694,336 B1* | 2/2004 | Multer et al. | 707/201 |
| 6,799,299 B1* | 9/2004 | Li et al. | 715/513 |
| 6,829,606 B1* | 12/2004 | Ripley | 707/5 |

\* cited by examiner

*Primary Examiner*—Sanjiv Shah
(74) *Attorney, Agent, or Firm*—Amin & Turocy, LLP

(57) ABSTRACT

The present invention relates to a system and methodology to facilitate XML data communications and processing. A diffgram data structure is provided that includes one or more states of a plurality of data records. The state information can be determined by examining one or more data sources for differences from one or more reference data sources. If differences are detected between the data sources, the diffgram can be constructed in an XML compatible format with both previous state indications and current state indications that describes the state differences between the data sources. Error information and/or other administrative information or codes can also be provided to facilitate database management and/or processing.

31 Claims, 13 Drawing Sheets

SYSTEM AND METHOD PROVIDING DIFFGRAM FORMAT

TECHNICAL FIELD

The present invention relates generally to computer systems, and more particularly to a system and method to generate an Extensible Markup Language (XML) compatible data structure and format that includes a current data format and associated indications of changes to previous versions of the current data.

BACKGROUND OF THE INVENTION

As computer technologies continue to push the bounds of ever increasing performance and innovation, computer system hardware and software requirements have dramatically increased in complexity and sophistication. This has become even more apparent with the growth of network technologies such as the Internet, for example, wherein ever increasing amounts of data are continually being operated upon, requested and transported. Other applications such as database managers are also being pushed to handle this increasing traffic of data. One technology that has emerged to transport and process data is XML, which is often referred to as a meta-markup language for text documents. Data can be described in XML documents as strings of text, wherein the actual data is encapsulated by text markup that describes the data. A unit of data and associated markup is defined as an element. Currently, XML defines how elements are delimited by tags, what a tag looks like, what names are acceptable for elements, and where attributes are placed, among other specifications, for example.

The markup in an XML document describes the underlying structure of the document and generally defines which elements are associated with other elements. The markup can also include document semantics. As an example, the markup can indicate that an element is a date, serial number, name or other type of code or designation. As these and other types of elements are transmitted (e.g., XML stream) between systems or databases, changes are often required to be made to existing data due to recently discovered errors in the data or due to the data having changed over time (e.g., person's name or address changing). Since XML merely indicates the most recent state of data, problems can occur as data is transported between databases and/or systems.

One such problem relates to errors having been previously transmitted to a database via an XML data stream. As an example, if a data record containing a person's name were erroneously transmitted with an incorrect middle initial, simply re-transmitting the name with the correct initial would not necessarily correct the previous error. For example, a new database entry with a different name could exist. Unless the erroneous name or data record were somehow purged from the database—which can cause an expensive amount of database processing, the database can become more difficult to administer over time and can grow past designed system memory boundaries. Similar problems exist when data records need to be changed or altered.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology that provide a protocol and data structure to facilitate efficient transmission and handling of an XML data source (e.g., files, documents, records). This is achieved by defining, generating and operating upon an XML compatible diffgram. In general, a diffgram is an XML transmittable file or record that includes data/state information from a current data source, data/state information relating to differences associated with a previous data source and indications of errors if desired, associated with the differences in the data sources. A diffgram format is provided that includes a container that defines boundaries for the diffgram and includes within the boundaries a description of the differences from previous XML transmissions or current database information. Thus, the difference information provided by the diffgram enables change-specific portions of a database (e.g., database records having errors, adding/removing data) to be updated without affecting or re-transmitting other associated data. As an example, a database may include a plurality of related records, wherein one or more of the records is to be changed, altered or updated. The diffgram provides a mechanism, wherein the record to be updated or changed is indicated by both current and previous states of the record. In this manner, applications such as a database manager, for example, can efficiently update a database without replicating redundant information, without having to determine what has changed in a new data transmission and also mitigating the time involved with correcting errors associated with previous erroneous database entries.

According to one aspect of the present invention, the container includes beginning and ending tags that define the boundaries of the container and the associated diffgram contents within the container. In order to construct a diffgram, a plurality of files or sources can be compared against one or more reference files to determine if differences exist between the files. The comparison can include one or more options that describe what differences between the files are to be determined (e.g., exact match, ignore white space). Upon determining the differences, one or more results are returned indicating whether differences between the files exist. For example, a true flag can be set if no differences are detected between the reference file or files and the compared file. If differences are detected, the results can be utilized to "fill" the container and provide the desired current file data, the differences between the current file data and the previous or reference data, and also include computer/human readable indications of errors that were detected between the data sets.

The error indications can be employed to provide diagnostic or administrative information as to the reason a database is changing and/or being updated. These indications can be utilized to correct errors in other portions of the database and/or synchronize/update one or more other databases. A plurality of related applications can also be supported via the diffgram data structure and protocol. This can include providing a difference tool to enable efficient administrative determinations of differences between databases on local and/or remote systems (e.g., determining staleness of data). Other related applications facilitated by diffgrams include updating, replicating, synchronizing, ordering from, and reconstructing one or more databases, for example.

The following description and the annexed drawings set forth in detail certain illustrative aspects of the invention.

These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate XML data communications and database processing. This is achieved by providing a diffgram data structure that includes one or more states of a plurality of data records. The state information can be determined by examining one or more data sources for differences from one or more reference data sources. If differences are detected between the data sources, the diffgram can be constructed in an XML compatible format with both previous state indications and current state indications that describes the state differences between the data sources. In this manner, databases can be efficiently updated or corrected by utilizing the desired current data. Previous erroneous entries can then be efficiently purged via the difference information provided by the diffgram. This also enables one or more other local and/or remote databases to be synchronized with the most recent or desired state of the data.

Figure 1:
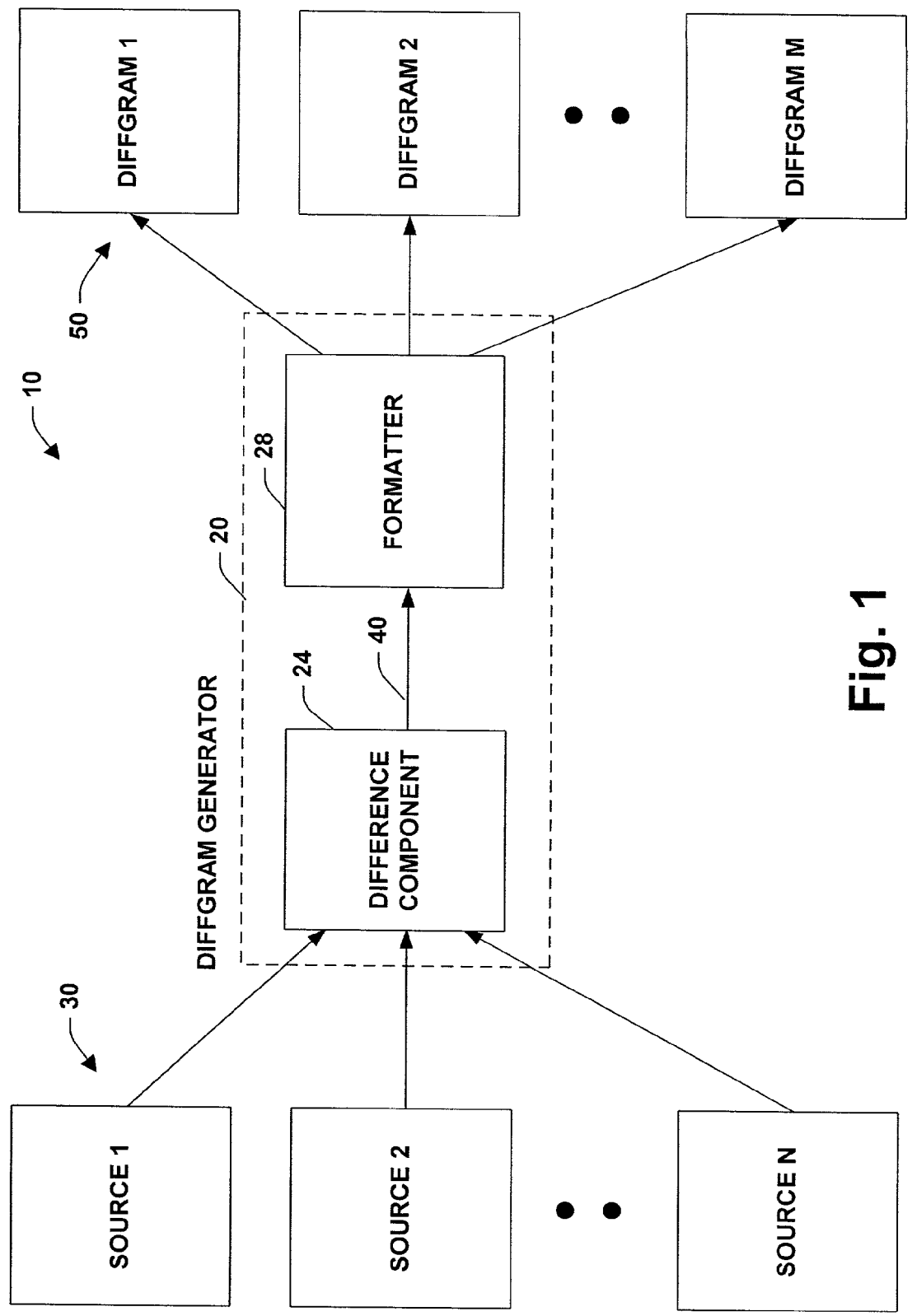
FIG. 1 is a schematic block diagram illustrating a system for generating one or more diffgrams in accordance with an aspect of the present invention.

Referring initially to FIG. 1, a system 10 illustrates diffgram generation and formatting in accordance with an aspect of the present invention. A diffgram generator 20 is provided that includes a difference component 24 and a formatter 28. The difference component analyzes N number of XML sources 30 (N being an integer) to determine if source or data differences exist between the sources. For example, the source$_1$ can be input to the difference component 24 as a reference file or document and source$_2$ can be input as a subsequent or comparison file. The difference component 24 then determines if any differences exist between the respective files. If so, one or more difference results 40 are output to the formatter 28 that utilizes the results 40 to construct M number of diffgrams 50 (M being an integer) in accordance with the present invention.

The diffgrams 50 which are provided in XML compatible format by the formatter 28, represent state or change information between a subset of the sources 30. This can include a representation of the source data as it existed in a previous state along with a representation of the data in its current or changed state. In this manner, the state information supplied by the diffgrams 50 can be utilized by a subsequent system or database to update, alter or change information and also utilize the difference information to mitigate having stale or unwanted data from remaining in the database. Additionally, since the current and previous states of the data are represented in standard XML format, a subsequent system such as a database manger can efficiently determine differences between new and previous data without having to process the database to determine if the previous data was in error and/or should subsequently be purged. As will be described in more detail below, error indications and/or other state information can be provided by the diffgrams 50 to facilitate database management and/or processing.

Figure 2:
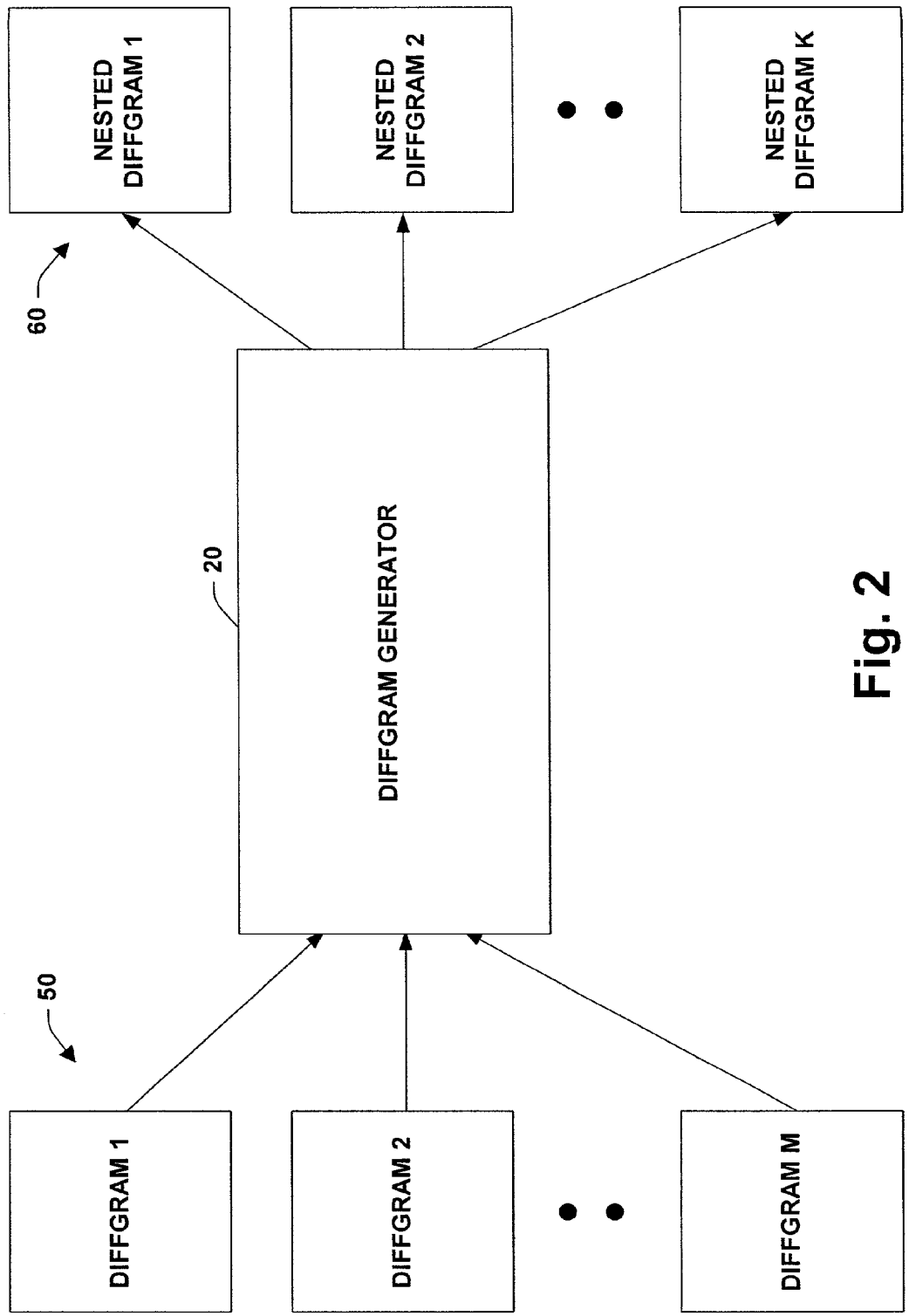
FIG. 2 is a schematic block diagram illustrating nested diffgrams in accordance with an aspect of the present invention.

Referring now to FIG. 2, the diffgrams 50 are illustrated in accordance with an alternative aspect of the present invention. Since the diffgrams 50 are created in XML compatible format, and generally represent an XML source file, the diffgrams 50 can be employed to construct one or more other diffgrams. For example, the diffgrams 50 can be input into the diffgram generator 20, wherein K number of nested diffgrams 60 are created (K being an integer). The nested diffgrams 60 represent current and previous states of a subset of the diffgrams 50. As an example of this structure, the DIFFGRAM$_2$ can be input to the diffgram generator 20 as a reference file. The DIFFGRAM$_M$ can be input as a comparison or current diffgram file or document. The nested diffgram$_1$ can then be constructed by the diffgram generator 20 to include the current information from the DIFFGRAM$_M$ and provide a description of the differences with the DIFFGRAM$_2$. Thus, the nested diffgrams provide state or change information between diffgrams.

Figure 3:
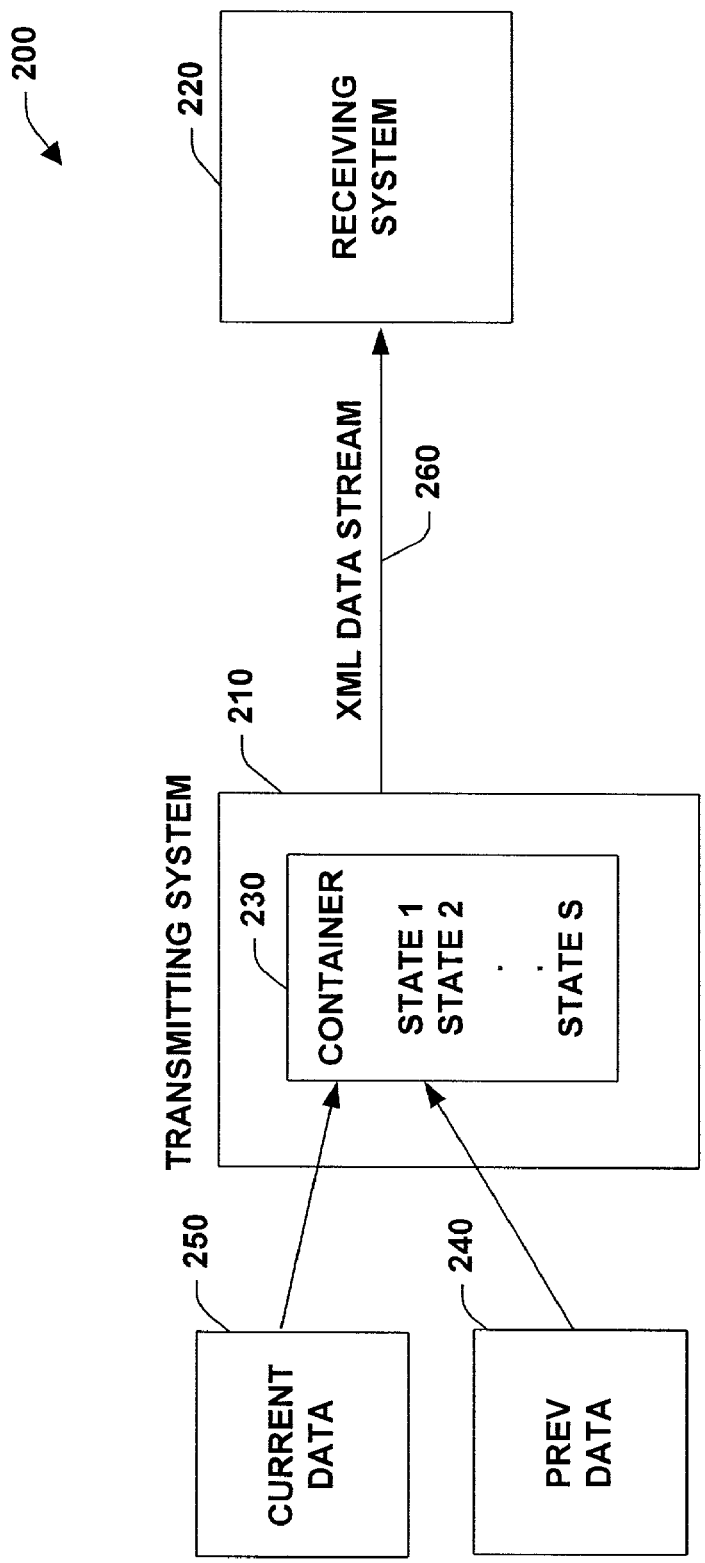
FIG. 3 is a schematic block diagram illustrating an exemplary diffgram container that is transmitted between two network systems in accordance with an aspect of the present invention.

Referring to FIG. 3, a network system 200 for transporting diffgrams is illustrated in accordance with an aspect of the present invention. The system 200 includes a transmitting system 210 such as a computer or network node and a receiving system 220 such as a local and/or remote database, computer or network node. The transmitting system provides a container 230 that includes content of diffgrams and is described in more detail below. The container 230 includes 1 to S states, S being an integer, of previous file comparisons and includes state information of both previous data states 240 and current data states 250. For example, a single comparison or reference file could be compared to a plurality of other files, wherein the states within the container 230 represents the previous and current states of the respective comparisons. Alternatively, the container 210 can include states of a plurality of separately compared files. For example, $STATES_1$ and $STATES_2$ could represent a comparison between a first subset of files (not shown), whereas $STATES_3$ and $STATES_4$ can represent a comparison of a second subset of files (not shown). It is to be appreciated that a plurality of comparisons and associated states can be similarly included. As illustrated, the contents of the container 230 can be transmitted via an XML data stream across a local and/or remote network connection 260 from the transmitting system 210 to the receiving system 220.

Figure 4:
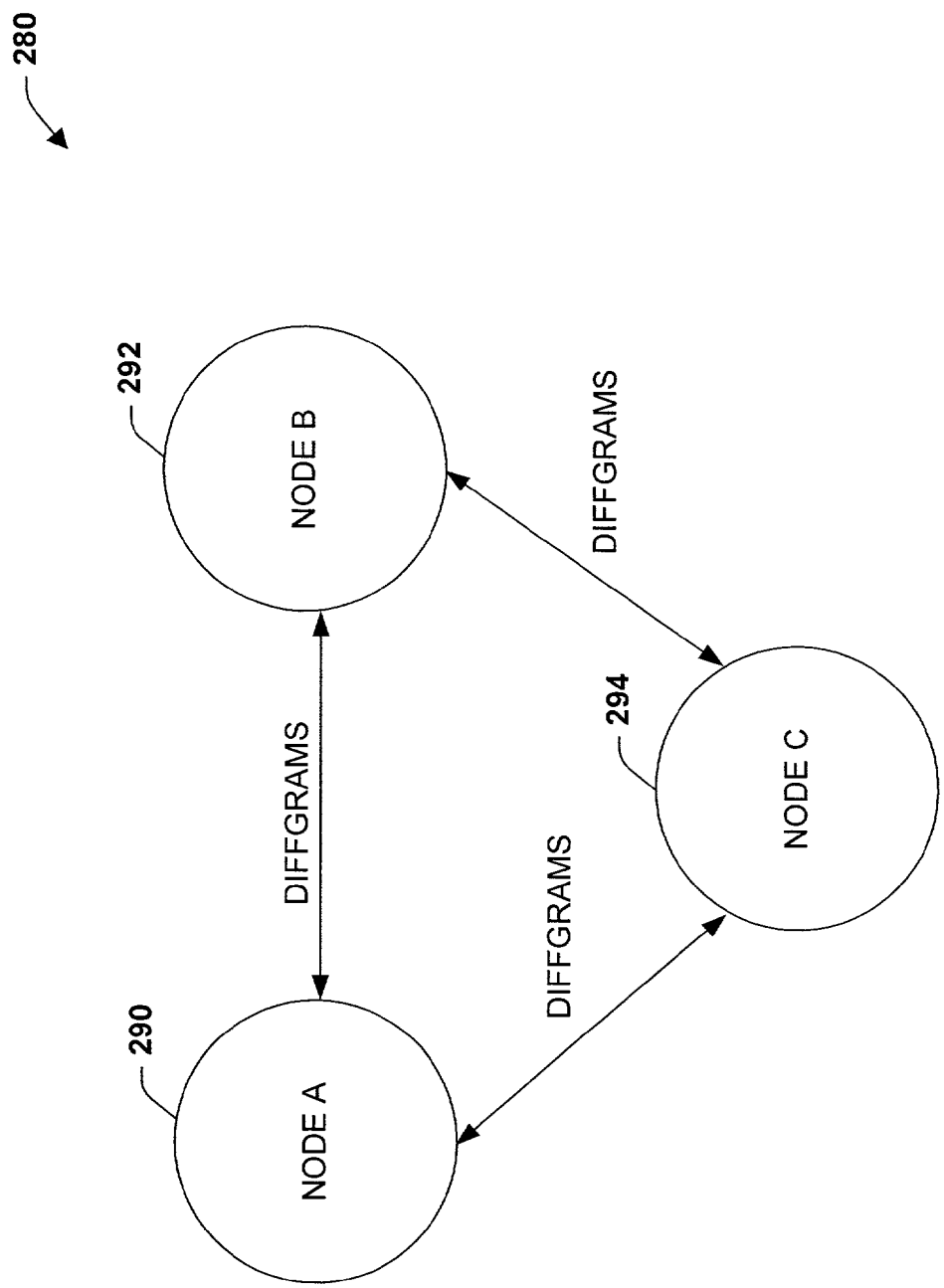
FIG. 4 is a network diagram illustrating diffgram applications in accordance with an aspect of the present invention.

Referring now to FIG. 4, a nodal system 280 is illustrated in accordance with an aspect of the present invention. Although three nodes 290, 292 and 294 are depicted in the system 280, it is to be appreciated that a plurality of such nodes can be included, wherein data packets are employed to transmit diffgram information between respective nodes. For example, the nodes 290–294 can represent a plurality of local databases on a computer system, a plurality of remote databases coupled via a network, a plurality of local network systems, and/or a plurality of remote network systems. As illustrated, one or more diffgrams as previously described can be communicated between the nodes 290–294 to facilitate a plurality of applications.

Figure 5:
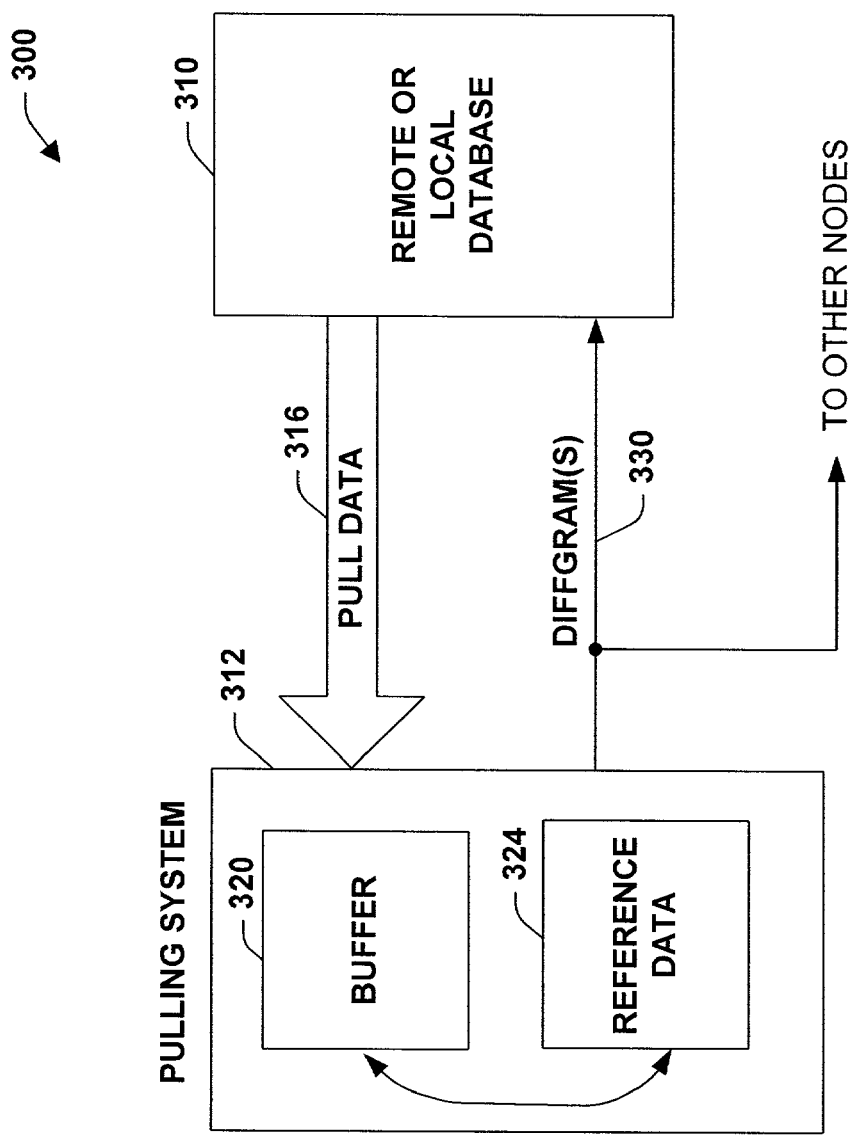
FIG. 5 is a diagram illustrating a data pulling system in accordance with an aspect of the present invention.

One such application can include pulling data from a node or database, generating an update to the data, and sending the data in the form of a diffgram to all desired nodes to provide an update or change to the existing state of data as illustrated in FIG. 5, for example. A system 300 is provided that includes a remote and/or local database 310. A data pulling system 312 is operatively coupled to the database 310 and pulls or reads one or more data records, files or documents 316 into a buffer 320. The buffer 320 is then compared to a reference data source 324 to determine if differences exist with the reference data 324. It is noted that the comparison between the reference data 324 and the data records 316 can happen directly without utilizing the intervening buffer 320. If differences exist between the data sources 320 and 324, one or more diffgrams 330 can be constructed to provide the desired current data from the reference data source 324, with an XML description of the differences between the data sources included in the diffgrams 330. The current data and the described differences within the diffgrams can then be sent to the database 310 or other database (not shown) as an update record.

The information within the diffgram 330 can be utilized to correct erroneous entries or to update records that may have changed over time by enabling the database 310 to focus on and remove/update data identified by the state or change information included in the diffgram 330. In this manner, data records that have not changed within the database 310 can be left substantially undisturbed and further database processing of the unchanged records can be mitigated. The system 300 can also be employed in other similar applications. For example, if the database 310 were to crash or suffer from loss of data, existing data 316 within the database 310 can be pulled into the buffer 320, wherein a diffgram 330 can be constructed against the reference data source 324. The diffgram 330 can then be sent to the database 310 or other databases as part of an XML stream to reconstruct or replenish the database with the lost or missing data.

Another similar application includes synchronizing one or more local or remote databases. For example, data can be pulled periodically from the database 310 or other database and checked against the reference data source 324. If differences exist, diffgrams 330 can be sent to synchronize the database 310 with the reference data source 324. Alternatively, if the reference source 324 were to change, diffgrams 330 could be sent to provide indications of the changes to one or more remote or local databases in order to synchronize the databases to the new reference data source 324.

Figure 6:
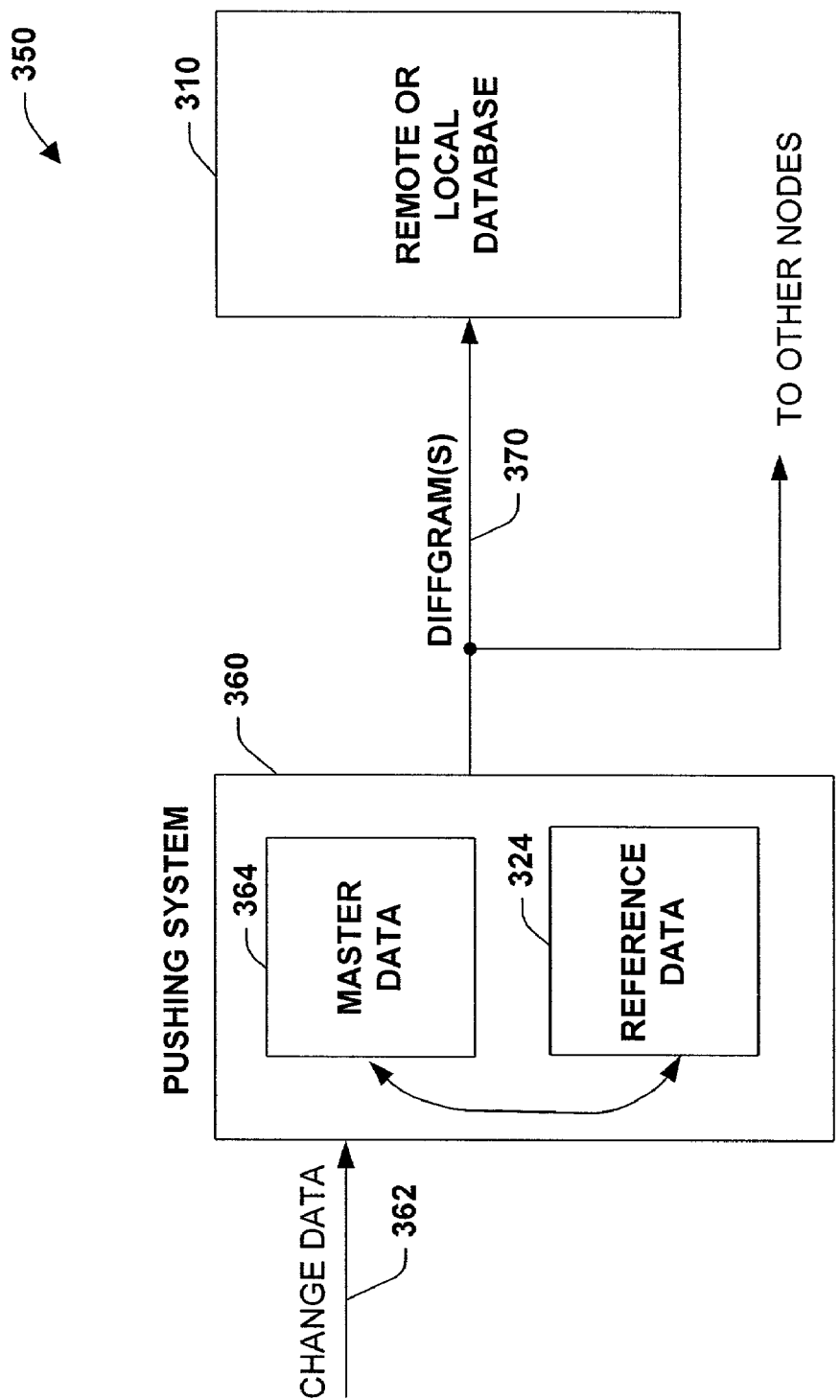
FIG. 6 is a diagram illustrating a replication system in accordance with an aspect of the present invention.

Turning to FIG. 6, a replication system 350 is illustrated in accordance with the present invention. The system 350 includes a pushing system 360 (e.g., cluster controller that synchronizes one or more member computers to the controller) that includes a master data source 364 and a reference data source 324. The master data source reflects the most recent data that has been input or sent to the pushing system 360 via a change data input 362 (e.g., keyboard, mouse, network connection, application program), whereas the reference data source 324 represents the data that has been previously sent out to the databases 310 or other nodes (not shown). If the master data source 360 changes via the change data input 362, a diffgram 370 can be constructed that represents the difference between the master data 364 and the reference data 324. The diffgram 370 can then be sent to one or more other remote or local databases 310 to update or synchronize the databases to the master data source 364. After the update is completed, wherein flags can be transmitted as an indication of the completion, the reference data source 324 can be updated to match the contents of the master data source 364. In the future, if changes are again made to the master data source 364, the above described synchronization process can be repeated.

Figure 7:
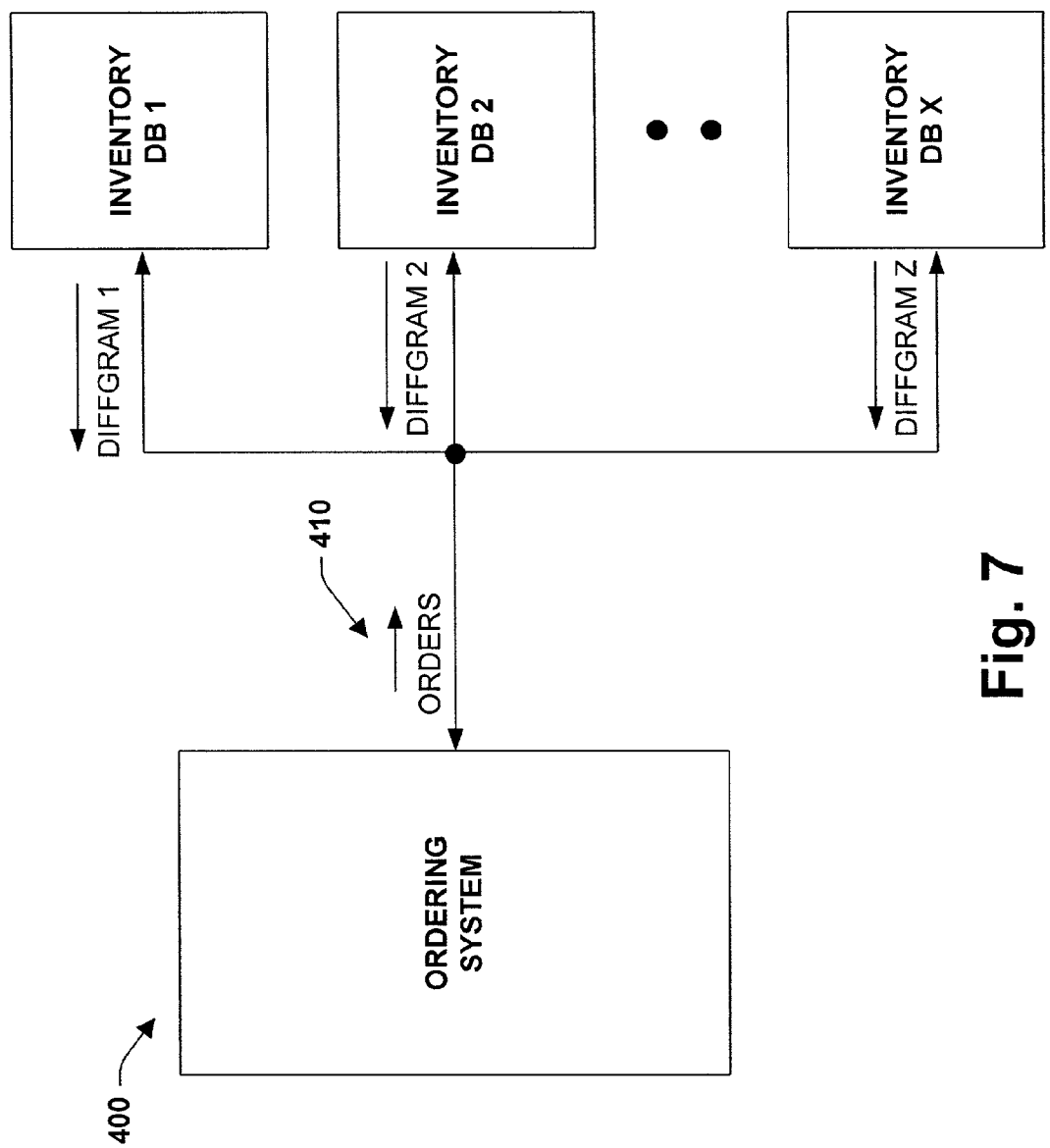
FIG. 7 is a diagram illustrating an ordering system in accordance with an aspect of the present invention.

Referring now to FIG. 7, another application can include an ordering system 400, wherein orders 410 (e.g., ordering items from an electronic catalog) are placed to a plurality of local or remote databases 1 though X (X being an integer). Diffgrams 1 through Z (Z being an integer) can then be sent in response to the orders to indicate differences in the requested order and the actual inventories on hand. For example, the order 410 can be sent from the ordering system 400 requesting 10 items. The databases 1–X can then compare the order 410 with existing inventory items in the databases. If all the items exist, a diffgram 1–Z can be sent indicating that no changes exist between the order 410 and the respective database. If differences exist between the order 410, and the respective inventory database, the diffgrams 1–Z can indicate what items are on hand as current data, and what items are not on hand as difference data. It is to be appreciated that the orders 410 can represent substantially any request for information from the databases 1–X.

Figure 8:
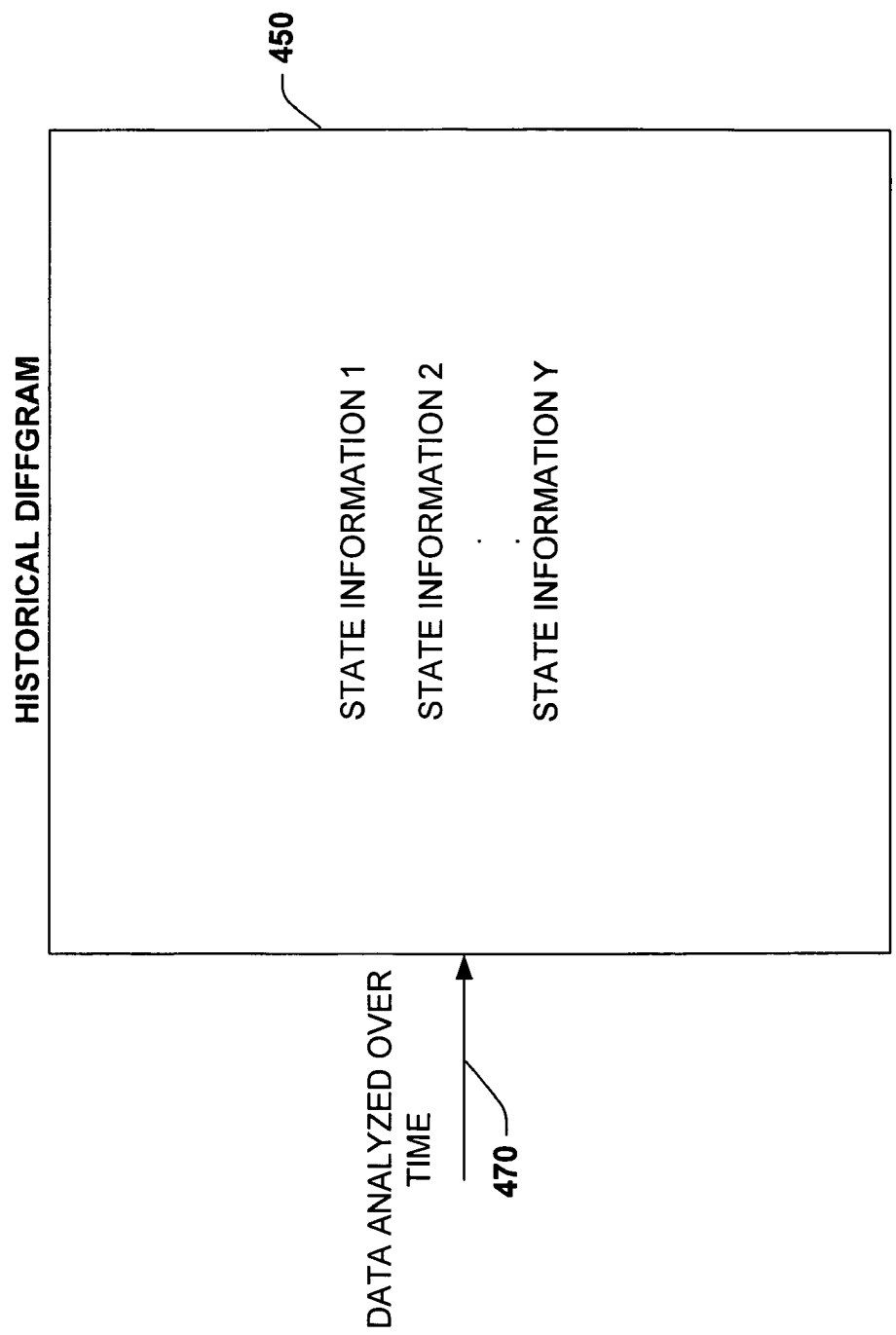
FIG. 8 is a diagram illustrating an analysis system in accordance with an aspect of the present invention.

Referring to FIG. 8, another diffgram application can include providing historical indications of change via the state information contained in a diffgram 450. For example, stock or business performance can be presented as changes have occurred over time within the respective stock or business. This is illustrated as respective state information 1 through Y within the diffgram 450 (Y being and integer). As an example of a historical analysis, a data source 470 (e.g., price of a stock) can be monitored over time. As changes occur to the data source 470, a respective diffgram entry represented by the state information 1–Y can be entered in the diffgram 450 that represents the previous value of the data source 470 and the current value of the data source 470. As changes occur over time to the data source 470, other subsequent entries of state information 1–Y can be included in the diffgram 450 to provide indications of how the data source has changed. As can be appreciated, the diffgram 450 can then be transmitted to subsequent systems for further analysis, display, and/or processing.

Figure 9:
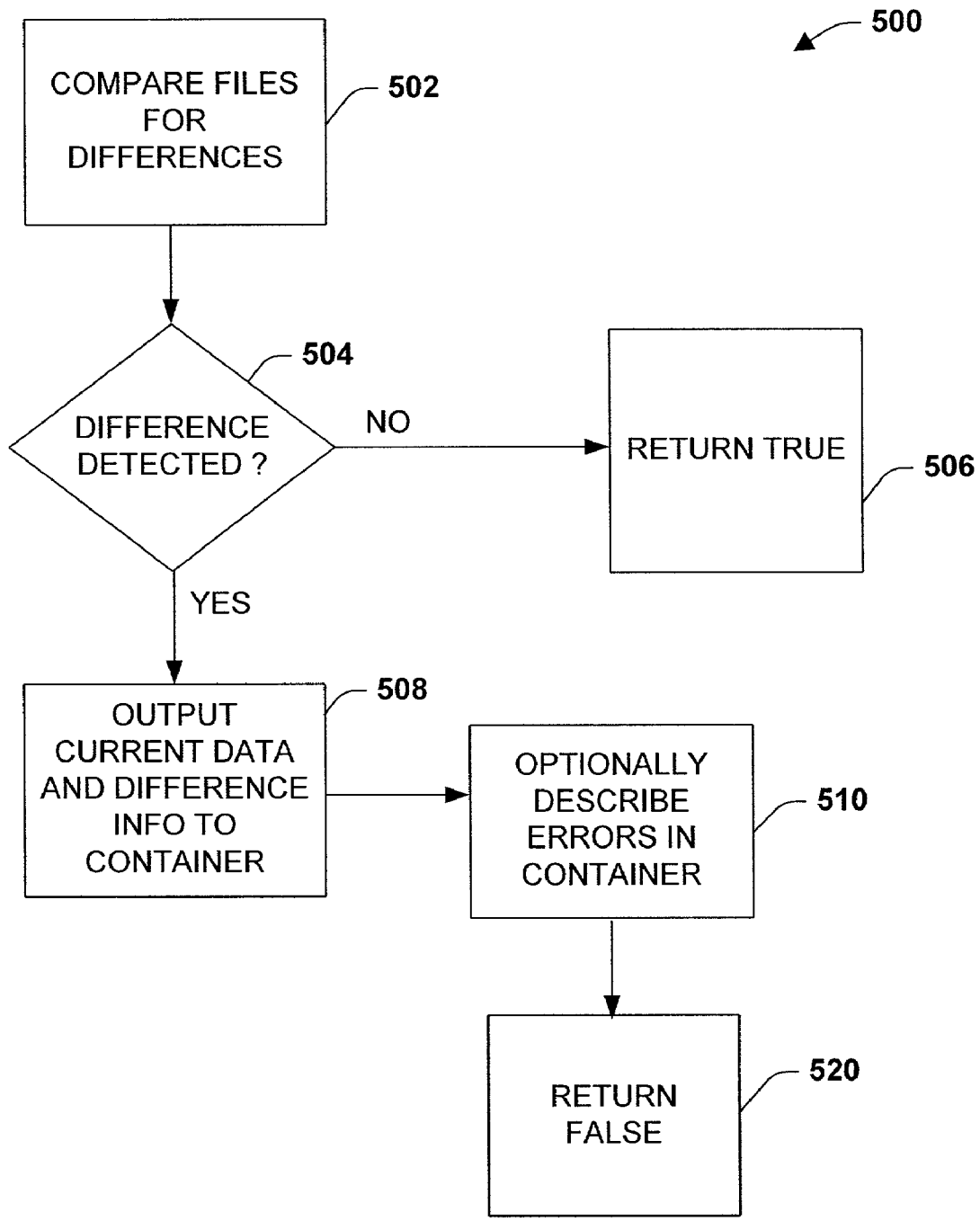
FIG. 9 is a flow diagram illustrating a methodology to provide diffgrams in accordance with an aspect of the present invention.

FIG. 9 illustrates a methodology to facilitate XML data communications and processing in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 502, two or more XML source files are compared for differences between the files. This can include determining the differences according to a plurality of options as described in more detail below. At 504, if differences are not detected between the source files, a return is executed at 506 and a true flag is set. If differences are detected between the source files at 504, the process proceeds to 508, wherein current data is output to a container along with the differences associated with the comparison at 502. At 510, error and/or other administrative information can be included in the container to indicate one or more reasons for the state changes that are indicated by the diffgram structure provided by the container. At 520, the container is closed and a return flag of false is sent to indicate that the results of the comparison yielded different data between the source files.

Figure 10:
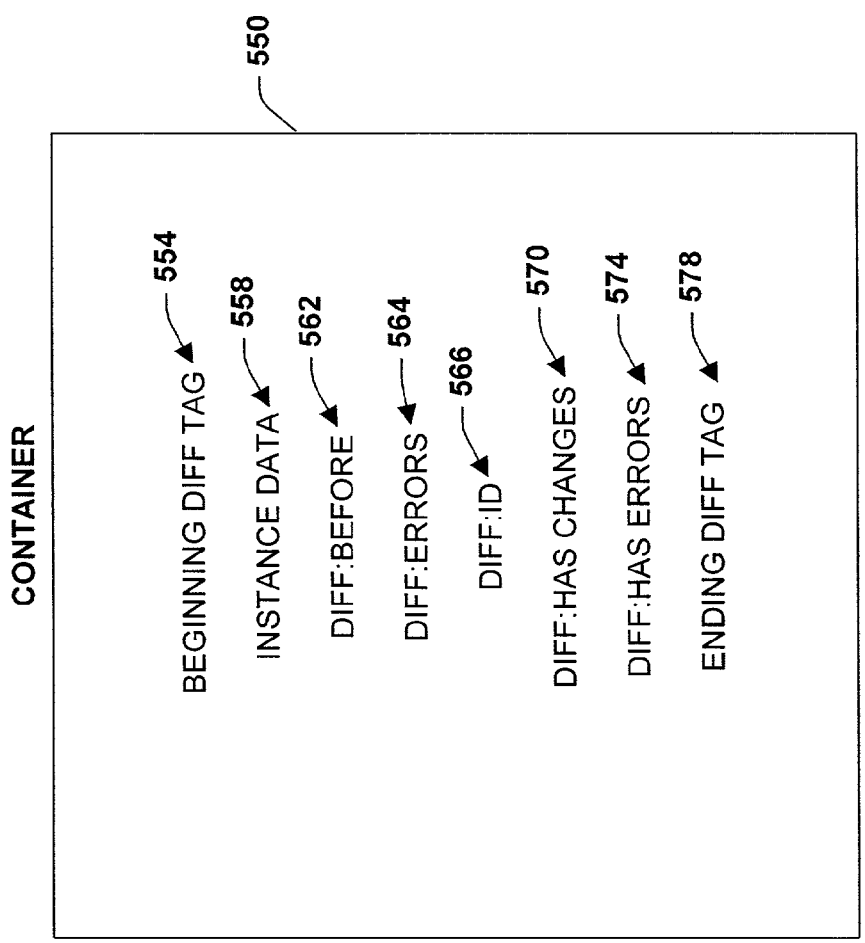
FIG. 10 is a diagram illustrating one or more possible diffgram container contents in accordance with an aspect of the present invention.

Turning now to FIG. 10, a container 550 is illustrated in accordance with an aspect of the present invention. The container 550 can include beginning and ending tags 554 and 578, instance data 558, before data 562, an id tag 566, a changes field 570 and an errors field 574. The general format for a diffgram as provided in the container 550 is composed of the following parts:

Diffgram version information:
<?xml version="1.0"?>

Following line points to source data and includes beggining tag 310:
<diffgr:diffgram   xmlns:msdata="urn:schemas-companyname-com:xml-msdata"

Following line describes diffgram format:
xmlns:diffgr="urn:schemas-companyname-com:xml-diffgram-01"

The following container contents are described below:

```
<ROOT_ELEMENT>
    <xml_instance_data>
    ...
    </xml_instance_data>
</ROOT_ELEMENT>
    <diffgr:before>
    ...
    </diffgr:before>
    <diffgr:errors>
    ...
    </diffgr:errrors>
</diffgr:diffgram>
```

The following provides a description of the above diffgram contents:

diffgr:diffgram (the Outer Container)

The diffgram tags 554 and 578 represent a container where the data is stored. The structure of the data inside can be:
1. An instance document.
2. A changes part representing the changes to the document in form of before and after data images.

Instance Data 558

This is the data part of the file and represents the current values of the data.

diffgr:before

The changes can be expressed in <before> tags.
   For updated rows the row is present and identified by the diffgr:id 566;
   For inserted rows no entry need be present;
   For deleted rows, the row deleted is present and identified by a diffgr:id 566 not present in the data part;

For the data in the instance part 558 such as for example:

```
<Customer diffgr:id="Customer20" Name="Bob">
    <City>Vienna</City>
</Customer>
This data can be present in the changes part.
<diffgr:before>
...
<Customer diffgr:id="Customer20" Name="Rob">
    <City>Monaco</City>
</Customer>
...
</before>
``` diffgr:errors 564

The errors are described in the errors part:

For this data in the instance part, for example:

```
<Customer diffgr:id="Customer20" Name="Bob">
    <City>Vienna</City>
</Customer>
```

The errors can be described in the following manner:

```
<diffgr:errors>
...
<Customer diffgr:id="Customer20" diffgr:Error="Some errors were present"
Name="Inconsistent name for this person">
    <City>The city is not correct</City>
</Customer>
...
</errors>
```

A similar format is utilized in the data part, the before part and the error part. There can be one before clause and one error clause and the before clause generally appears before the errors clause.

diffgr:id 566

The id tag can be added to the elements:
It should be unique for substantially all the elements in the stream;
It is generally required on elements in the before part;
It is generally required on modified elements in the data part;
It is optional on un modified elements in the data part.

If the id tag 566 is present in the before clause, but there is no equivalent tag in the instance data a processor that has to merge the two parts can be configured to throw an error.

diffgram:haschanges 570

This attribute is generally present in modified elements in the data instance part.

It can have the following values:
"inserted" if the element has been inserted;
"modified" if the element has been modified;

This is useful to have information early in the parsing of a document, for example.

diffgram:hasErrors 574

This tag is generally present in elements that have errors in the data part or in the before part (e.g. deleted elements).

It can have this value:
true: meaning that the element has errors

Figure 11:
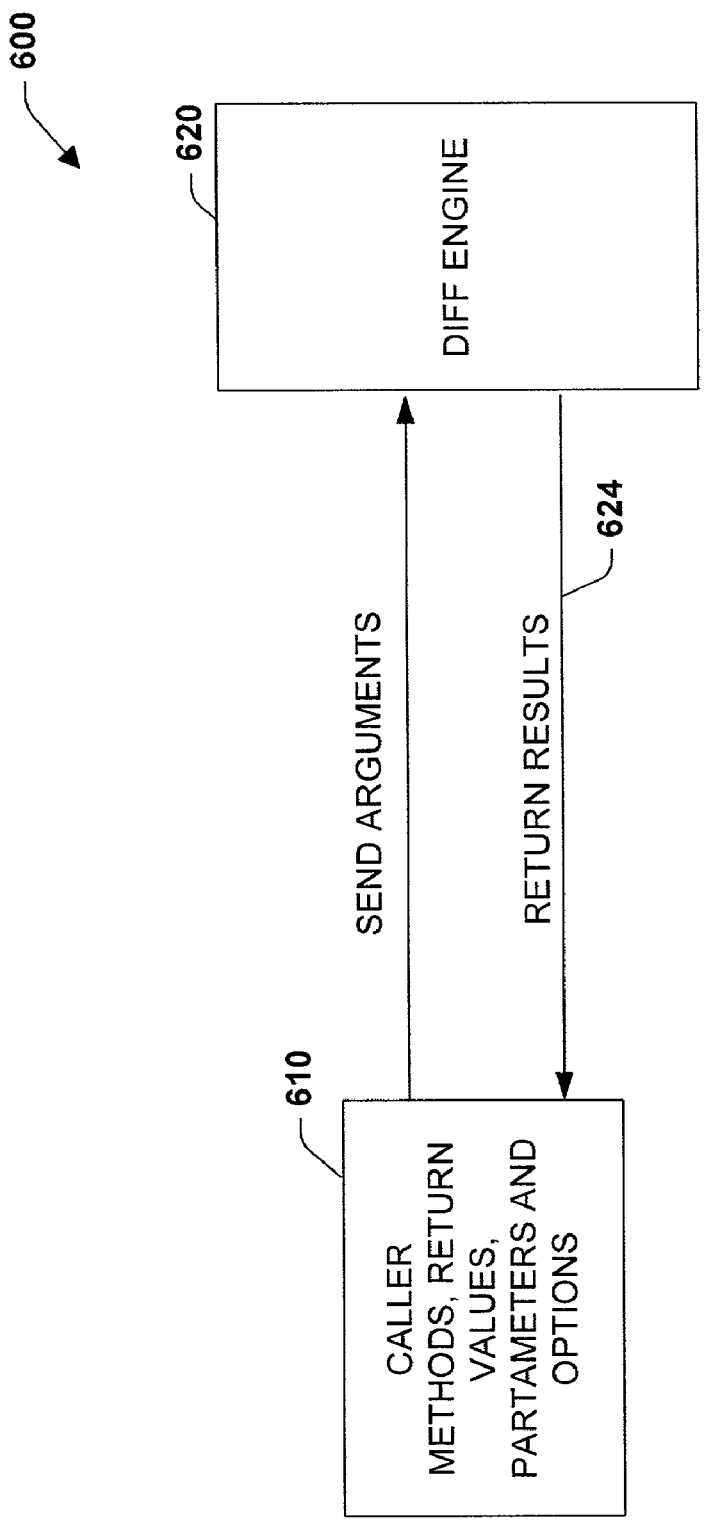
FIG. 11 is a diagram illustrating diffgram generation options and methods in accordance with an aspect of the present invention.

Referring now to FIG. 11, an exemplary diffrgam generation system 600 is illustrated in accordance with an aspect of the present invention. A caller 610 is provided that can call a diff engine 620 to construct the diffgrams. One aspect of the caller 610 is to instruct the diff engine 620 regarding comparison options for determining the diffgrams. The following table illustrates an exemplary list but is not intended as an exhaustive list of options.

| Value | Description |
| --- | --- |
| None | Options are set to false. |
| IgnoreEmptyElement | If this option is set to true, then the comparison considers "<foo></foo>" to be equal to "<foo/>". |
| IgnoreWhitespace | If this option is set true, then white spaces are ignored during the comparison by the diff engine. |
| IgnoreComments | If this option is set to true, then comment nodes are not considered in the comparison. |
| IgnoreAttributeOrder | If this option is set to true, then comparison returns true if you have similar attributes but in different order. |
| IgnoreNS | If this option is set to true, then namespaces are not considered during the comparison. |
| IgnorePrefix | If this option is set to true, then a prefix is not considered during the comparison. |
| IgnoreDTD | If this option is set to true, then DTD information is ignored during the comparison. If this flag is false then respective XML files generally have a reference to the DTD file, otherwise it will throw an exception. |

After selecting an option, the caller 610, then can invoke a plurality of various methods, having associated parameters and providing for respective return values. An example listing is as follows:

| Method | Return Type | Parameters | Description |
| --- | --- | --- | --- |
| Compare( ) | bool | String source, String target | Compares the input XML documents. |
| Compare( ) | bool | XmlTextReader source, XmlTextReader target | Returns true if the documents are the same. False if the documents are different. The same as above except this method accepts XML reader instead of document location. |
| ToXml( ) | String | | Returns the XML representation of the diff result between the two input XML documents. |

Figure 12:
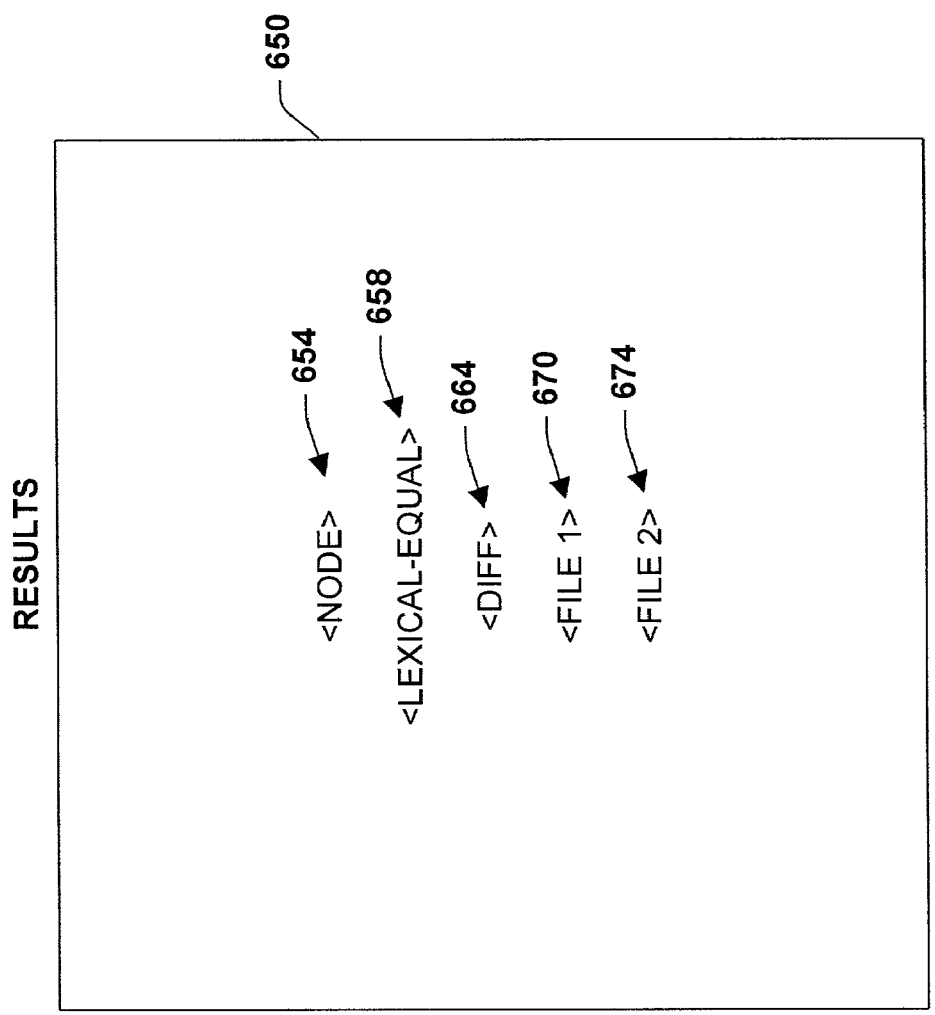
FIG. 12 is a diagram illustrating diffgram results in accordance with an aspect of the present invention.

An exemplary method invocation and option setting is illustrated as follows wherein one or more results 624 are subsequently returned:

XMLDIFF DIFF NEW XMLDIFF( );
  diff.Option=XmlDiffOption.IgnoreAttributeOrder |
    XmlDiffOption.IgnoreEmptyElement;

Turning to FIG. 12, a results file 650 provided by the diff engine 620 above is illustrated in accordance with an aspect of the present invention. The results file 650 can include a node field 654, a lexical-equal field 658, a diff field 664, and file fields 670 and 674. The following table provides a description of the respective fields:

| Node | Description |
| --- | --- |
| <Node> | These elements contain the result of respective compared nodes. This node has two child elements <Diff> and <Lexical-equal>. It also can have four attributes representing the line numbers and line position of the compared nodes. A value of −1 for these attributes represents that it is an extra node in the other document. |
| <Lexical-equal> | If the nodes are compared successfully then these elements contain the text of compared node wrapped in a CDATA section. |
| <Diff> | If the comparison fails then the <Diff> elements contain <File1> and <File2> elements, that contain the text of mismatched nodes wrapped in a CDATA section. The <Diff> element may only contain one of the <File1> or <File2> element. In this case, it represents an extra node in one of the XML documents. It also contains an attribute "DiffType" that can have values from 1–11 (see table below), representing the reason why the compared nodes are different. |
| <File1> | The text in these nodes represents the compared node in first XML document. |
| <File2> | The text in these nodes represents the compared node in second XML document. |

The following represents an exemplary diff engine result:

<Root>
  <Node SourceLineNum="1" SourceLinePos="5" TargetLineNum="1" TargetLinePos="5">
    <Diff/>
    <Lexical-equal>
      <![CDATA[<root/>]]>
    </Lexical-equal>

-continued

```
    </Node>
    <Node SourceLineNum="2" SourceLinePos="5" TargetLineNum="2" TargetLinePos="5">
        <Diff DiffType="7">
            <File1>
                <![CDATA[<!-- Comment 1 -->]]>
            </File1>
            <File2>
                <![CDATA[<a/>]]>
            </File2>
        </Diff>
        <Lexical-equal/>
    </Node>
</Root>
```

The value of the DiffType attribute described above represents reasons or codes concerning why compared nodes are not matched; the following table describes the meaning for different values of a DiffType attribute:

| Value | Description |
| --- | --- |
| 1 | Element value not matched. |
| 2 | White spaces not matched. |
| 3 | Comment node not matched. |
| 4 | Processing instruction not matched. |
| 5 | Text node not matched. |
| 6 | Attribute name or value or order not matched. |
| 7 | Namespace not matched of the compared node. |
| 8 | Prefix not matched of the compared node. |
| 9 | Extra node(s) in source file. |
| 10 | Extra node(s) in target file. |
| 11 | Node type not matched. |

Figure 13:
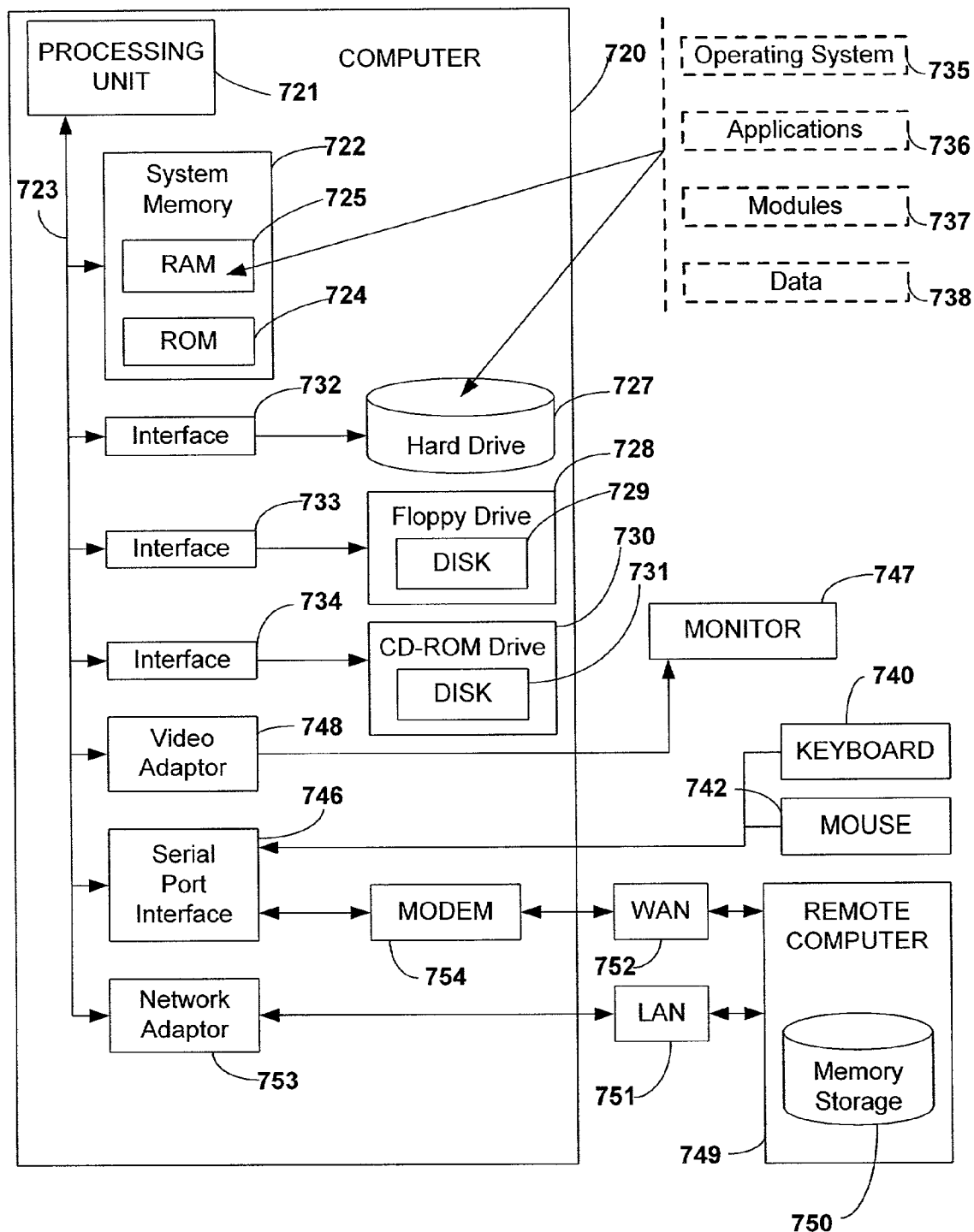
FIG. 13 is a schematic block diagram illustrating a suitable operating environment in accordance with an aspect of the present invention.

In order to provide a context for the various aspects of the invention, FIG. 13 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 13. The logical connections depicted in FIG. 13 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer-implemented system for differentiating at least two XML data sources, comprising:
   a difference component within a computer that determines differences between the XML data sources; and
   a formatter associated with the difference component that describes and outputs the differences together with a representation of at least one of the XML data sources.

2. The system of claim 1, the difference component being a diff engine that determines the differences based upon one or more input options.

3. The system of claim 2, the options include at least one of: none, ignore empty element, ignore white space, ignore comments, ignore attribute order, ignore namespace, ignore prefix, and ignore DTD.

4. The system of claim 2, the diff engine adapted to receive a plurality of methods and associated parameters relating to the XML data sources and return one or more difference results.

5. The system of claim 4, the one or more difference results including at least one of: a node field, a lexical-equal field, a diff field, and one or more file fields.

6. The system of claim 4, the one or more results further comprising at least one of: element value not matched, white spaces not matched, comment node not matched, processing instructions not matched, text node not matched, attribute name or value not matched, namespaces not matched, prefix not matched, extra nodes in source file, extra nodes in target file, and node type not matched.

7. The system of claim 4, the formatter adapted to generate a container that includes the results of the diff engine.

8. The system of claim 7, the container including a nested diffgram that includes difference information between one or more files, the files describe differences between the XML data sources.

9. The system of claim 7, the container including S states, S being an integer, the states representing comparisons between a reference file and one or more other files.

10. The system of claim 7, the container including S states, S being an integer, the states representing comparisons between a plurality of reference files and one or more other files.

11. The system of claim 7, the container including beginning and ending tags to define the boundaries of the container.

12. The system of claim 7, the container including an instance data field and a before data field to describe the differences between the XML data sources.

13. The system of claim 7, the container including at least one of an ID field, a changes field, and an error field.

14. The system of claim 1, the formatter outputs a data packet that comprises:
   a first data field representing a previous state of XML data; and
   a second data field representing a current state of the XML data.

15. The system of claim 14, the data packet transmitted to at least one of: a local network system, a remote network system, a local database, and a remote database.

16. A computer-implemented method to facilitate XML data processing, comprising:
   comparing two or more source files to determine if differences exist between the source files;
   filling a container with previous state results and current state results based at least in part upon the comparison; and
   determining whether corrective procedures should be taken with respect to data within a database as a function of the comparison.

17. The method of claim 16, further comprising providing options that include ignoring one or more elements during the comparison.

18. The method of claim 16, returning one or more difference results relating to the differences between the two or more source files.

19. The method of claim 16, further comprising nesting diffgrams via a comparison of two or more records that describe differences between XML data sources.

20. The method of claim 16, further comprising generating S states, S being an integer, the states representing comparisons between the two or more source files.

21. The method of claim 16, further comprising generating S states, S being an integer, the states representing comparisons between a plurality of source files.

22. A computer-implemented system to facilitate communication of a data source, comprising:
   a transmission system within a computer that determines a previous and a current state of a data source; and a container configured and output by the transmission system having tags to define boundaries for the data sources, the container including an indication of the previous and the current states of the data sources within the defined boundaries.

23. The system of claim 22, further comprising a receiving system to process contents of the container.

24. A computer readable medium having stored thereon a data structure to represent XML data, comprising:
   a container field that delineates boundaries of an XML data source;
   a previous state field associated with the container field comprising data representing a prior status of the XML data source; and
   a current state field associated with the container field comprising data representing one or more changes to the XML data source.

25. A computer-implemented system to facilitate XML data communications, comprising:
   means for determining differences between two or more XML source files; and
   means for representing previous states and current states corresponding to the differences between the two or more XML source files.

26. A computer-implemented system to communicate XML data between nodes, comprising:
   a first node operatively coupled to a database resident within one or more computers, the database having one or more data records; and
   a buffer associated with the first node that reads the database and compares a reference data source to determine differences among the one or more data records, the first node constructs one or more diffgrams that describe the differences between the reference data source and the one or more data records, the diffgram further includes a representation of at least one of the data records.

27. The system of claim 26, the one or more diffgrams employed to at least one of correct erroneous entries and update data records that have changed over time by enabling the database to update data identified by state information included in the diffgram.

28. The system of claim 26, the one or more diffgrams employed to reconstruct a faulted database.

29. The system of claim 26, the one or more diffgrams employed to synchronize the reference data source to one or more other databases.

30. A computer-implemented system to communicate XML orders between nodes, comprising:
   an ordering subsystem resident upon a computer to generate orders to one or more databases, the one or more databases having one or more inventory records; and
   a component associated with the one or more databases that compares the one or more inventory records to determine differences among the orders, the component constructs one or more diffgrams that describe the differences between the one or more inventory records and the order to indicate status of the inventory.

31. An XML compatible diffgram resident upon a computer that stores states of an XML data source, comprising:
   a container to describe boundaries of the diffgram;
   a first component that indicates a prior state of the XML data source; and
   a second component that represents one or more state changes to the XML data source.

* * * * *